United States Patent [19]

Cielo et al.

[11] Patent Number: 4,480,168
[45] Date of Patent: Oct. 30, 1984

[54] LASER-SURFACE COUPLER

[75] Inventors: Paolo G. Cielo, Montreal; Serge Dallaire, Longueuil, both of Canada

[73] Assignee: Canadian Patents & Development Limited, Ottawa, Canada

[21] Appl. No.: 363,301

[22] Filed: Mar. 29, 1982

[51] Int. Cl.³ .............................................. B23K 27/00
[52] U.S. Cl. ........................... 219/121 L; 219/121 LQ; 219/121 LR; 219/121 FS
[58] Field of Search ..... 219/121 L, 121 LM, 121 LP, 219/121 LR, 121 LQ, 121 LU, 121 FS

[56] References Cited

U.S. PATENT DOCUMENTS

| | | | |
|---|---|---|---|
| 3,757,078 | 9/1973 | Conti et al. | 219/121 LQ X |
| 4,167,662 | 9/1979 | Steen | 219/121 LQ X |
| 4,288,678 | 9/1981 | Rocca | 219/121 LE |

Primary Examiner—C. L. Albritton
Attorney, Agent, or Firm—Edward Rymek

[57] ABSTRACT

The laser-surface coupler is used to uniformly irradiate a well defined surface area with a laser beam. The coupler includes a lower masking section and an upper section to form a cavity. The masking section has inner surfaces which are highly reflective and lustrous, and an aperture to define the surface area to be irradiated. The upper section has an opening to receive the laser beam into the cavity, and a highly reflective and diffuse inner surface to reflect and diffuse any radiation reflected to it from the irradiated surface. The coupler recycles any reflected radiation from the laser beam increasing the absorption coefficient and the irradiated surface is precisely defined by the masking section without loss of energy.

10 Claims, 4 Drawing Figures

LASER-SURFACE COUPLER

BACKGROUND OF THE INVENTION

This invention is directed to laser surface treating and, in particular, to apparatus for coupling the laser optical energy to the surface.

Laser surface treating is an industrial process by which the surface of a metal or other material is rapidly heated by a laser beam. The subsequent quenching by heat conduction when the laser is turned off produces a hardened surface layer in metals which is better defined than the layers obtained by flame or induction hardening. Various materials can also be predeposited on the surface in order to obtain wear or corrosion resistant surface alloys. Laser processing is potentially a very efficient technique because it can treat preferentially a specific portion of the surface, and very little energy is lost through heating of the bulk material.

One of the problems faced by this technique is the small coupling coefficient of the laser radiation into surface heat. Most metals have reflectivities of the order of 90% or more, particularly at the long IR wavelength of the industrial $CO_2$ lasers. Semiconductors such as silicon are also highly reflective in the molten state. Consequently, a very small fraction of the laser energy is absorbed by the metal's surface. Absorbing paints are used to increase the absorption coefficient, but this technique is not satisfactory for a number of reasons. The paint is quickly vaporized by the laser beam, leaving the bare metal's surface for most of the laser's dwell time. Part of the laser's energy must be spent against the heat of vaporization of the paint, thereby further reducing the overall efficiency. The hot metal surface is particularly subject to contamination by the paint's chemical residues.

Apparatus has also been devised to refocus the laser radiation reflected from the surface of the workpiece. Examples of these are described in U.S. Pat. No. 3,757,078 which issued on Sept. 4, 1973, to Conti et al; and U.S. Pat. No. 4,288,678 which issued on Sept. 8, 1981, to La Rocca. Since these devices attempt to refocus the reflected radiation, they produce a beam with a short depth of field and an irradiated area wherein the edges are poorly defined. A good beam edge sharpness is desirable in order not to heat treat a previously worked region, or a region where heat treating is not wanted.

Another problem which must be addressed is the non-uniformity across the laser beam caused by the spatial modulation of a multi-mode laser output as well as the tapered beam's edges. This results in partial vaporization of the surface in certain regions, while other regions are not raised above the temperature threshold for a martensitic transformation which will provide the desired working of the surface. A rapidly vibrating mirror has been used to integrate the laser power over a wide surface. Because of its complexity and the non-uniform exposure inherent to a sinusoidal scanning, this technique is now being replaced by optical integrating techniques. The best known is the mosaic of mirrors manufactured by the company SPAWR, which is now adopted by some major manufacturers of laser machining equipment, such as AVCO Everett. Such techniques are very effective in smoothing the multi-mode beam profile, but the sharpness of the beam's edges which they can produce is limited by diffraction.

SUMMARY OF THE INVENTION

It is therefore an object of this invention to provide an optical device for efficiently coupling laser radiation to a surface.

It is a further object of this invention to provide an optical device which couples the radiation uniformly over a defined surface area.

These and other objects are achieved in a laser surface coupler for irradiating a surface area using a laser beam, which comprises a lower masking section that has an aperture defining the surface area to be irradiated; and an upper section located over the masking section to form a cavity, the upper section having an opening therein for the laser beam. The upper section will preferably have a highly reflective diffuse inner surface to reflect and diffuse any radiation reflected to it from the irradiated surface and the masking section will have a highly reflective lustrous inner surface to reflect any radiation directly to the upper section and from this to the irradiated surface.

The upper section may be shaped to have an inner surface which is spherical or slightly aspherical, and the masking section may be shaped such that the inner surface is pyramidal or conical with the aperture at the apex of the pyramid or cone.

The opening for the laser beam in the upper section may be small to receive a beam with a focus point substantially at the opening. The opening may be located at the center of the upper section such that the beam will be incident on the surface to be irradiated, or the opening may be located to one side such that the beam will be incident on the inner surface of the masking section. In this situation, the region of incidence would preferably be a highly reflective diffuse surface.

In accordance with another aspect of this invention, the opening in the upper section may be adapted to receive a substantially collimated laser beam entering the coupler to one side and being incident on the surface to be irradiated at a predetermined angle.

Many other objects and aspects of the invention will be clear from the detailed description of the drawings.

DETAILED DESCRIPTION

Figure 1:
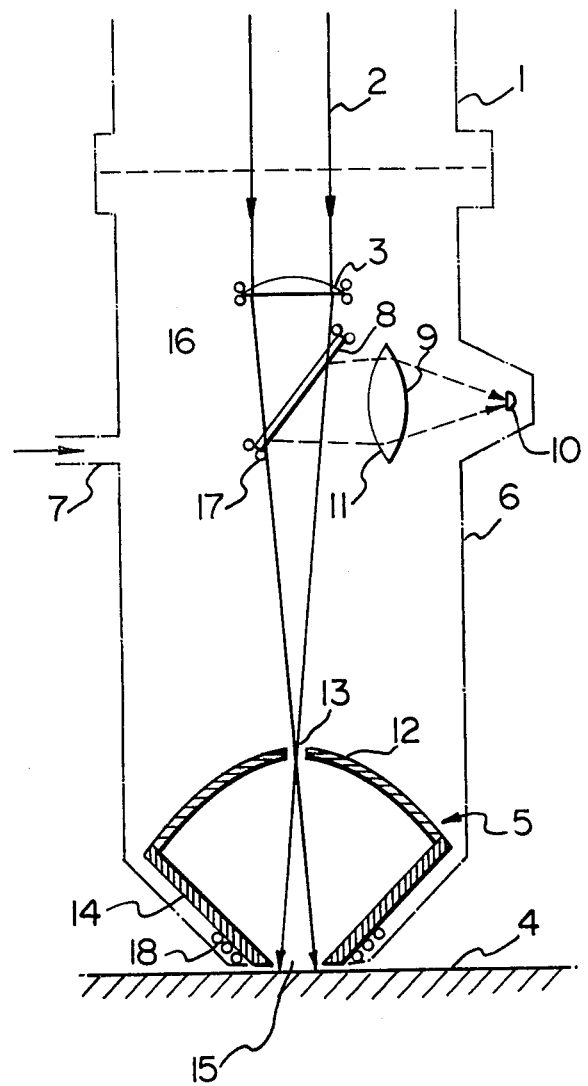
FIG. 1 illustrates the laser-surface coupler in a heat treating arrangement.

FIG. 1 illustrates schematically in cross-section, a laser heat treating assembly wherein the laser 1 provides the heat treating beam 2. The laser 1 may be any one of a number of conventional lasers, such as a $CO_2$ or an Excimer laser. The beam 2 is directed by a lens 3 unto the surface 4 to be treated. As stated above, it is desired that a well defined area of the surface be treated uniformly. The laser-surface coupler 5, in accordance with the present invention, achieves this by redirecting all reflected radiation back onto a defined area of the surface 4.

The assembly further includes a casing 6 in which the lens 3 and coupler 5 are mounted and which may be flushed with an inert gas such as He, Ar or N with a flow rate in the order of 10 L/min. through an opening 7. The inert gas flows out between the bottom of the coupler 5 and the surface 4 under treatment, thus avoiding contamination or oxidation of the hot surface by the ambient atmosphere.

The heat treating assembly may also include an infrared monitoring system for the continuous monitoring of the temperature of the surface to be treated. Such feedback systems are currently used to make sure that the surface reaches the threshold temperature witout vaporization. The system shown comprises a dichroic mirror 8, a focussing lens 9 and IR detector 10, whose output can be connected to a feedback loop monitoring the laser beam's intensity. The dichroic mirror 8 transmits the laser radiation 2 but reflects the near IR thermal radiation 11 emitted by the surface under treatment. This monitoring technique, though well known in laser processing systems, is particularly well adapted for use with the coupler 5 in accordance with the present invention.

The laser-surface coupler 5 consists essentially of two sections forming a reflecting cavity, an upper, highly reflective section 12 having an opening 13 for beam 2, and a lower masking section 14. An aperture 15 in the masking section 14 at surface 4, physically defines the area of the surface 4 which is to be uniformly irradiated by the beam 2 radiation.

The upper section 12 allows the laser beam 2, which is focussed at the opening 13, to enter the coupler 5. In addition, the inner surface of section 12 reflects any radiation reflected to it, back towards the surface 4 to be treated. High reflectivity towards the surface 4 area may be achieved by having a spherical inner surface which is diffuse-gold plated, or a slightly aspherical inner surface which is gold-plated. In this way, successive reflections tend to smoothen out the intensity of the radiation over the irradiated surface area. Aspheric or diffuse-gold coated shells are maufactured by a number of companies, such as Aero Research Ass. or Labsp- here.

Figure 2:
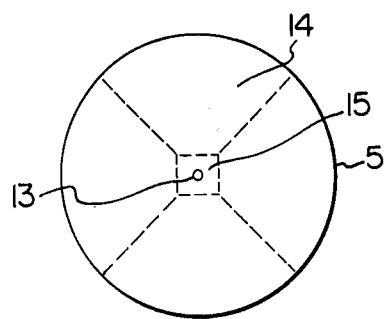
FIG. 2 illustrates the laser-surface coupler in plan view.

The masking section 14 inner surface may also be gold-plated, however, with a metallic lustre, to render it highly reflective to radiation incident upon it. Thus, all radiation reflected from the upper section 12 will be directed onto the surface 4 to be treated in an area with sharply defined edges as defined by aperture 15. Aperture 15 may be of any desired shape depending on the overall surface area to be treated. For simplicity in construction, the masking section 14 may be conically shaped with a circular opening 15. However, if the apparatus is to be used to treat a large surface, it would be preferred to have an opening 15 that is square as shown in FIG. 2, thereby allowing adjacent well defined areas of the surface 4 to be treated sequentially. The masking section 14 may be somewhat pyramidal in shape throughout, or starting out pyramidal at the bottom and changing to conical at the top.

Figure 3:
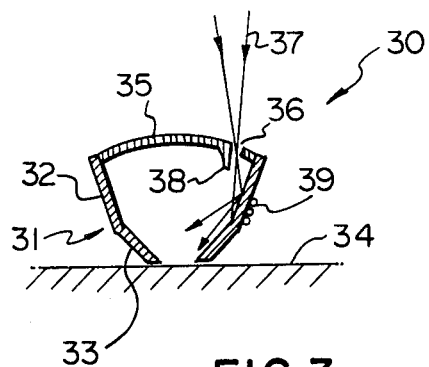
FIG. 3 illustrates a second embodiment of the laser-surface coupler.
Figure 4:
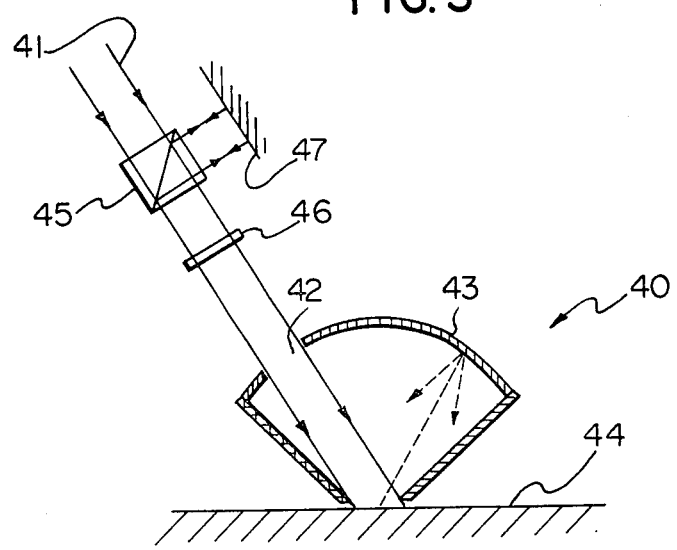
FIG. 4 illustrates a third embodiment of the laser-surface coupler.

FIGS. 3 and 4 illustrate further embodiments of the laser-surface coupler in accordance with the present invention. In the coupler 30, in FIG. 3, the shape of the inner surface of the masking section 31 consists of two truncated cones 32 and 33, the first 32 has a diffusing coating, while the second 33, near the surface 34, is specularly reflecting. The highly reflective upper section 35 is either slightly diffusing or slightly aspherical as in the coupler in FIG. 1. However, in this embodiment, the opening 36, through which the laser beam 37 is focussed, is positioned off of center so that the incident laser beam 36 is diffusely reflected by the first conical surface 32 before reaching the surface 34 to be treated. This provides for very good beam uniformity, at the expense of a slightly lower coupling efficiency and depth of field when compared with the embodiment of FIG. 1. A small shield 38 is located at the opening 36 to minimize the radiation losses through opening 36 particularly when the laser beam 37 axis is not vertical, which will cause it to circulate around in one direction in the coupler 30.

The embodiment of the coupler 40, shown in FIG. 4, is particularly useful when a highly metallic surface 44 is being treated. The laser beam 41 is directed into the coupler 40 onto the surface 44 without focussing and at a tilted angle of incident through a large opening 42 in the upper, highly reflective section 43 of the coupler 40. The inside surface of the upper section being diffuse reflective or slightly aspherical, and the angle of incidence being tilted, results in a minimum of radiation losses through the opening 42. Moreover, a combination of a polarizing beam-splitter 45 followed by a conveniently oriented quarterwave plate 46 allows a one-time back-reflection off of a mirror 47 of the radiation lost through the opening 42, provided that the laser beam 41 is initially polarized.

Cooling coils 16, 17 and 18 are shown on the lens 3, the dichroic mirror 8 and the masking section 14, respectively, in FIG. 1, and further coils 39 are shown on the masking section 32 in FIG. 3 at the area of incidence of the beam 37, to maintain these components at a tolerable temperature. However, very little cooling will be required in the coupler because its highly reflective inner surface will absorb very little radiation.

Many modifications in the above described embodiments of the invention can be carried out without departing from the scope thereof, and therefore, the scope of the present invention is intended to be limited only by the appended claims.

We claim:

1. A laser-surface coupler for use with a laser beam to irradiate a surface area comprising:
a lower masking section having an aperture for defining the surface area to be irradiated; and
an upper section located over the masking section to form a cavity, the upper section having an opening therein for the laser beam, the cavity having inner surfaces for redirecting light reflected within the cavity from the defined surface area back towards the defined surface area thereby coupling a substantial portion of the laser beam energy uniformly across the defined surface area.

2. A laser-surface coupler as claimed in claim 1 wherein the masking section has a highly reflective lustrous inner surface.

3. A laser-surface coupler as claimed in claim 2 wherein the upper section has a highly reflective diffuse inner surface.

4. A laser-surface coupler as claimed in claim 3 wherein the upper section inner surface is spherical.

5. A laser-surface coupler as claimed in claim 2 or 3 wherein the upper section inner surface is sightly aspherical.

6. A laser-surface coupler as claimed in claim 1 wherein the inner surface of the masking section is pyramidal having a square aperture.

7. A laser-surface coupler as claimed in claim 1 wherein the inner surface of the masking section is conical having a circular aperture.

8. A laser-surface coupler as claimed in claim 1, 2 or 3 wherein the opening is located at the center of the upper section to receive a laser beam having a focus point substantially at the opening.

9. A laser-surface coupler for use with a laser beam to irradiate a surface area comprising:
- a lower masking section having an aperture for defining the surface area to be irradiated; and
- an upper section located over the masking section to form a cavity, the upper section having an opening therein for the laser beam, the opening being located to one side of the upper section to receive a laser beam having a predetermined angle of incidence with the surface to be irradiated.

10. A laser-surface coupler for use with a laser beam to irradiate a surface area comprising:
- a lower masking section having an aperture for defining the surface area to be irradiated; and
- an upper section located over the masking section to form a cavity, the upper section having an opening therein for the laser beam, the opening being located to one side of the upper section to receive a laser beam having a focus point substantially at the opening and being incident on the inner surface of the masking section, the masking section having a highly reflective diffuse inner surface in the region of beam incidence, and a highly reflective lustrous inner surface in the region of the aperture.

* * * * *